United States Patent [19]
Mogul

[11] Patent Number: 6,097,882
[45] Date of Patent: Aug. 1, 2000

[54] METHOD AND APPARATUS OF IMPROVING NETWORK PERFORMANCE AND NETWORK AVAILABILITY IN A CLIENT-SERVER NETWORK BY TRANSPARENTLY REPLICATING A NETWORK SERVICE

[75] Inventor: Jeffrey C. Mogul, Menlo Park, Calif.

[73] Assignee: Digital Equipment Corporation, Maynard, Mass.

[21] Appl. No.: 08/497,095

[22] Filed: Jun. 30, 1995

[51] Int. Cl.[7] .............................. G06F 13/00; G06F 13/38
[52] U.S. Cl. .................................. 395/200.31; 395/200.69
[58] Field of Search .................. 395/200.05, 200.06, 395/200.1, 200.12, 200.13, 200.15, 200.18, 200.01, 200.02, 200.38, 200.55, 200.5, 200.57, 200.63, 200.68, 200.76, 200.3, 200.79

[56] References Cited

U.S. PATENT DOCUMENTS

| 5,133,053 | 7/1992 | Johnson et al. ......................... 395/200 |
| 5,210,748 | 5/1993 | Onishi et al. ......................... 370/85.13 |
| 5,307,496 | 4/1994 | Ichinose et al. ......................... 395/650 |
| 5,347,633 | 9/1994 | Ashfield et al. ......................... 395/200 |
| 5,396,493 | 3/1995 | Sugiyama .................................... 370/60 |
| 5,444,848 | 8/1995 | Johnson, Jr. et al. ............. 395/200.15 |
| 5,515,513 | 5/1996 | Metzger et al. ................... 395/200.15 |
| 5,524,254 | 6/1996 | Morgan et al. .......................... 395/800 |
| 5,537,542 | 7/1996 | Eilert et al. ......................... 395/184.01 |
| 5,553,239 | 9/1996 | Heath et al. ......................... 395/187.01 |
| 5,581,757 | 12/1996 | Maxey ..................................... 395/610 |
| 5,588,121 | 12/1996 | Reddin et al. ...................... 395/200.15 |
| 5,592,672 | 1/1997 | Grewal et al. ...................... 395/200.15 |

*Primary Examiner*—Mark H. Rinehart
*Attorney, Agent, or Firm*—A. Sidney Johnston

[57] ABSTRACT

A client-server network including a number of client computer systems, each of the client computer systems having a network interface, a number of server computer systems, each of the server computer systems having a network interface, and a replicator system connecting the client computer systems to the server computer systems, the replicator system transparently processing a number of requests from the client systems to a number of services resident in the server systems.

15 Claims, 3 Drawing Sheets

METHOD AND APPARATUS OF IMPROVING NETWORK PERFORMANCE AND NETWORK AVAILABILITY IN A CLIENT-SERVER NETWORK BY TRANSPARENTLY REPLICATING A NETWORK SERVICE

FIELD OF THE INVENTION

The present invention involves computer networking, and more specifically an improved system and method of improving network performance and network availability in a client-server computer network by transparently replicating a network service.

BACKGROUND OF THE INVENTION

In general, a computer network is the an interconnection of computer systems and other devices to facilitate the transfer of data and commands between and among the computer systems and network devices making up the network. One type of computer network, generally referred to as a client-server network, is used extensively in both local area networks (LANs) and on world-wide networks, such as the Internet. In a client-server network, several client computer systems (clients) generally are connected to a common server computer system (server) through a variety of network connections. Users of this type of network usually communicate with the network via the client systems. Further, applications which are resident in the various client computer systems typically establish some sort of association with a single server system. With such an arrangement, the client applications may then exchange commands and data with the associated server system.

By way of example, a user may be utilizing an application on a client system that provides word processing capabilities. When the user wishes to print a word processing document, for example, the word processing application may send the document and a print command over the network to the server system. The server system may then direct a printer, for example, which might be connected to the server system, to print the word processing document.

With such a client-server arrangement, several potential flaws may reveal themselves. For example, the server system may not have sufficient performance, memory for example, to provide acceptable service to all of its clients. In another example, the server system may fail, leaving the client systems without any access to the service or services which it offers.

A number of potential solutions to the above problems have been proposed in the prior art. For example, it is known that a performance problem in the server system may be solved by using a server system which contains more than one processor, i.e., a multiprocessor server system. With such an arrangement, if the performance of the server system is related to its central processing unit (CPU), providing additional CPUs in the server system may suffice.

In another example, performance of the server system may be increased by providing additional server disk storage subsystems or additional memory.

However, these approaches still introduce additional problems. For example, it is known that multiprocessor systems are expensive. It is also know that multiprocessor systems do not scale well past a few CPUs because of bottlenecks internal to the server system. Finally, it is known that microprocessor systems often fail as a unit. Thus, if one component of the multiprocessor system fails, the entire system may fail, thus rendering it useless.

Solutions have also been proposed in the past to overcome these problems associated with multiprocessor systems. For example, one such solution is to use the concept of "replicated servers." With replicated servers, a network designer may provide one or more backup servers systems to provide a redundancy. This redundancy allows the clients to connect to a second server system when a first server system has failed or is suffering performance problems. And as also know in the art, such a replication technique usually requires extensive software modifications by the network designer on the server systems, and often on the client system as well. In addition, with such a replication technique, it is well known that it is difficult to balance the load among the servers systems. Further, it is well known that, with such a replication technique, it is very difficult to balance the load when one of the redundant server systems fails, and difficult to 'steer' the network communication to the appropriate redundant server system.

An improved replicated server system is needed to overcome the above stated problems.

SUMMARY OF THE INVENTION

In accordance with the present invention, a client-server network including a number of client computer systems, each of the client computer systems having a network interface, a number of server computer systems, each of the server computer systems having a network interface, and a replicator system connecting the client computer systems to the server computer systems, the replicator system transparently processing a number of requests from the client systems to a number of services resident in the server systems.

BRIEF DESCRIPTION OF THE DRAWINGS

The novel features believed characteristic of the invention are set forth in the appended claims. The invention itself, however, as well as features and advantages thereof, will be best understood by reference to the detailed description of specific embodiments which follows, when read in conjunction with the accompanying drawings, wherein:

DESCRIPTION OF THE PREFERRED EMBODIMENTS

Figure 1:
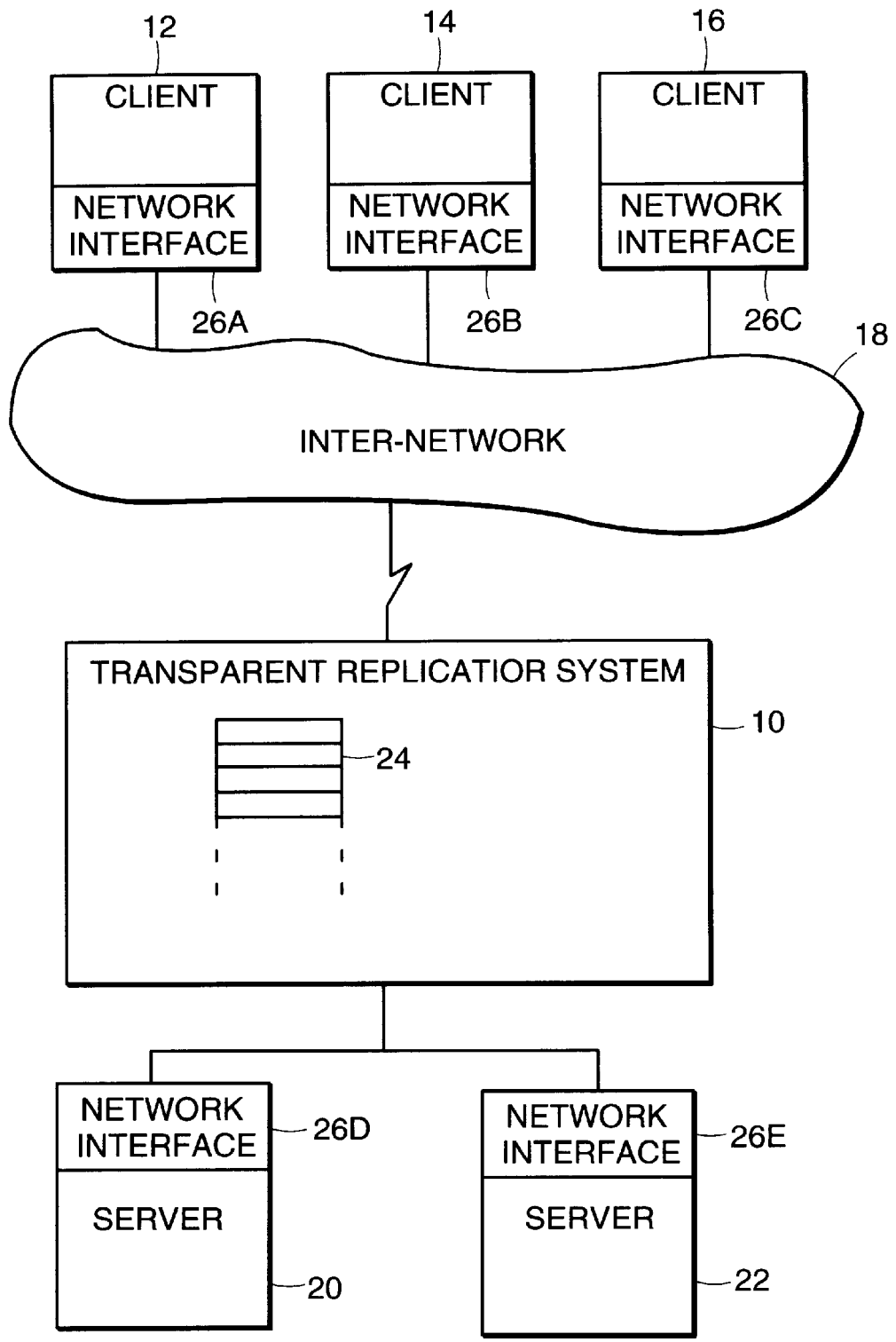
FIG. 1 is a block diagram of an exemplary client-server network incorporating a first embodiment of the present invention.

Referring to FIG. 1, an exemplary client-server computer network incorporating a transparent replicator 10 in accordance with the present invention is shown to include three client computer systems labeled as client 12, client 14, and client 16. The network is further shown to include an internetwork 18. The inter-network 18 provides connection between the clients 12, 14, and 16, and the transparent replicator 10. Also shown as part of the exemplary client-server network are two server replicas, labeled as 20 and 22, respectively. To facilitate communication, each of the clients 12, 14, and 16, as well as the servers 20 and 22, incorporate a network interface. Thus, client 12 is shown to contain network interface 26A, client 14 has network interface 26B, client 16 contains network interface 26C, server 20 contains network interface 26D, and server 22 contains network interface 26E. The network interfaces 26A–26E link the respective client and server systems to the network, and contain client and server processes, respectively. These client and server processes may be represented by TCP port numbers, which are abstractions that transport protocols use to distinguish among multiple destinations within a given host computer. TCP/IP protocols identify ports using small positive integers.

The transparent replicator 10 sits between the server replicas 20 and 22 and their clients 12, 14, and 16, in a position to intercept all communications. There may be more than two server replicas in use, and they may not all be attached to the same network. However, in this situation, their route to the clients 12, 14, and 16 must all pass through the transparent replicator 10.

Clients 12, 14, and 16 of the services offered by server replicas 20 and 22 know only one address for any single service. By way of example, we might assume an address "Z"; this address may or may not be the address of a real system. The transparent replicator 10 monitors arriving data packets, looking for requests for new connections or associations directed at address Z. When the transparent replicator 10 sees a request from address Z, from client 12 for example, it decides which of the server replicas 20 and 22 should receive the request according to a set of policies described below. For example, the transparent replicator 10 might alternate between replica 20 and replica 22.

The transparent replicator 10 now makes an entry in an internal table 24, noting that this particular connection or association between client 12 and service request for address Z has been directed at server 20, for example. The transparent replicator 10 then rewrites the data packet to direct it to server 20, changing any data packet checksums (not shown) as necessary. Finally, the transparent replicator 10 forwards the data packet to server 20.

Server 20 processes the data packet as it would if it had been connected directly to client 12, and addresses its replies to client 12. The transparent replicator 10 intercepts these data packets as well, and consults its internal table 24 to discover the appropriate entry. The transparent replicator 10 rewrites the reply data packets to appear as if they came directly from server 20, again changing any packet checksums (not shown) as necessary. Finally, the transparent replicator 10 forwards the reply data packet(s) to the client 12.

The transparent replicator 10 does not change the source address of incoming data packets, or the destination address of outgoing data packets. In this manner, client 12 believes it is communicating with server 20, while server 20 believes it is communicating directly with client 12.

When a connection or association is terminated, the transparent replicator 10 can remove the associated table entry from its internal table 24.

The transparent replicator 10 may use a variety of techniques to determine if any of the replicas 20 and 22 have failed. For example, if one of the servers, 22 for example, does fail, connections or associations that are in progress on that replica server 22 may have to be suspended or restarted. However, the transparent replicator 10 can avoid steering any new requests to the failed server 22, until it recovers.

In another example, if the replica servers 20 and 22 have different performance characteristics, the transparent replicator 10 can choose among the replica servers 20 and 22 according to a pre-specified load fraction. With such an arrangement, for example, the transparent replicator 10 could steer seventy-five percent (75%) of the requests to server 20, and only twenty-five percent (25%) to server 22, if server 20 were three times faster than server 22.

In another example, the transparent replicator 10 may adjust the load balance dynamically as it tracks current loads on each of the replica servers 20 and 22.

Figure 2:
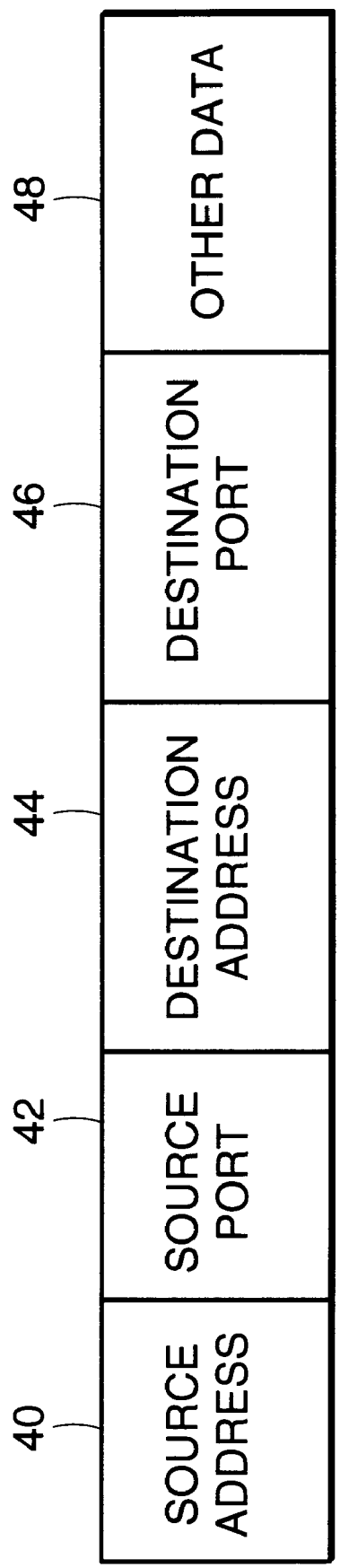
FIG. 2 is a block diagram of a schematized IP/TCP packet.

By way of another example, the present invention may be applied to TCP connections. TCP/IP is a protocol that is used on the Internet. Referring to FIG. 2, a schematized IP/TCP packet is shown to consist of a source-address 40, a source TCP port number 42, a destination-address 44, a destination port number 46, and other data 48.

Referring again to FIG. 1, in an exemplary connection attempt, if a client process executing on client 12 and using TCP port number 1001 attempts to establish a connection to a server process that is executing on server 20 and using TCP port number 2999, client 12 will identify the connection by (12, 1001, 20, 2999). However, the transparent replicator 10 may want to steer this connection to TCP port number 3777 on server 22, resulting in a connection identification of (12, 1001, 22, 3777). The transparent replicator 10 will insert an entry into its internal table 24 mapping between identification (12, 1001, 20, 2999) and identification (12, 1001, 22, 3777). Thus, TCP data packets coming from client 12 on this connection will have their IP destination address changed to server 22 and their TCP port number changed to TCP port number 3777. TCP data packets returning from the server 22 to the client 12 on this connection will have the appropriate reverse transformation applied. Both the IP header checksum and the TCP checksum must be adjusted to reflect the difference in server addresses, i.e., between virtual server 20 and the actual server 22. The TCP checksum must be adjusted to reflect both this difference and the difference between the TCP port number numbers. These checksum transformations are accomplished and carried out in the transparent replicator system 10. The IP and TCP checksum values are easily updated for a change of this sort; and one does not have to revisit the entire data packet to fix the checksum. Thus, for each TCP data packet the transparent replicator 10 must do a table lookup in its internal table 24 and several addition and subtraction operations, which is similar to what a traditional network router performs. Since TCP is a "reliable" network protocol, the transparent replicator 10 will maintain entries in its internal table 24 in stable storage for as long as the connection exists. It is preferred that non-volatile random access memory (NVRAM) be utilized in the transparent replicator 10. It is more preferred that approximately twelve bytes of storage be utilized since each connection description requires about twelve bytes of storage. In this manner, one Mbyte of NVRAM would suffice for almost ninety thousand connections.

The present invention may also be applied to networks utilizing other protocols, such as the IP/UDP protocol. The IP/UDP protocol uses essentially the same port number scheme as IP/TCP, and almost the same packet format.

Figure 3:
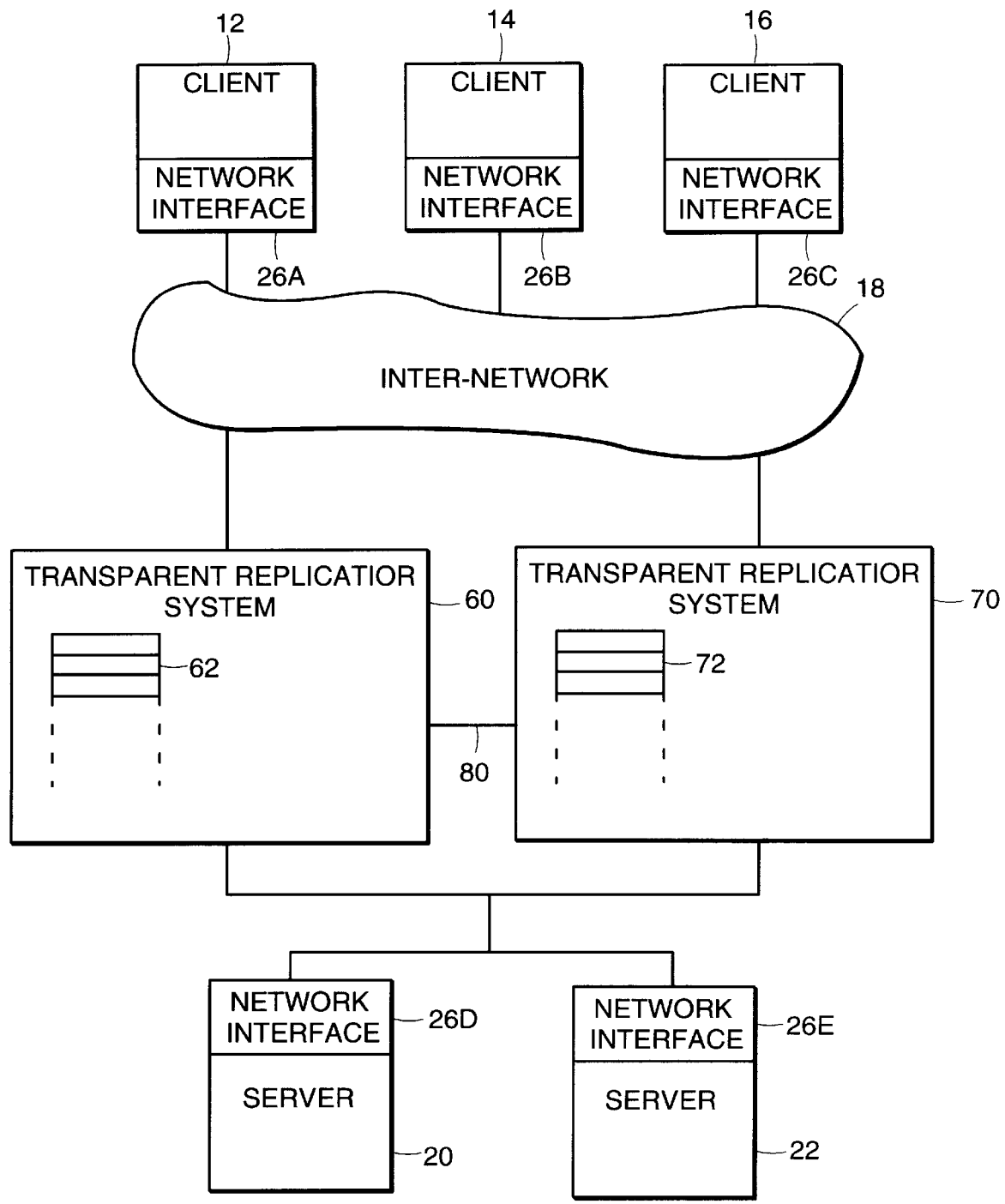
FIG. 3 is a block diagram of an exemplary client-server network incorporating a second embodiment of the present invention.

In the embodiment presented above, the transparent replicator 10 may itself be a single point of failure or a potential performance bottleneck. Referring to FIG. 3, a second embodiment of the present invention includes two transparent replicators labeled as 60 and 70, respectively. With such an arrangement, the two transparent replicators 60 and 70 coordinate between themselves via replicator line 80 so as to have consistent internal table entries. Although communication between transparent replicators 60 and 70 is shown via replicator line 80, two or more replicators may communicate via any available path, including the inter-network 18 or a LAN that connects the replicators 60 and 70 and the servers 20 and 22. If transparent replicator 60 creates a new table entry in its internal table 62, before forwarding the request data packet to server 20, it will communicate its new entry to transparent replicator 70 via replicator line 80 so that transparent replicator 70 may update its internal table 72. This is done so that if server 20 a replies to the client via replicator 70, the proper data packet transformation will be done. Communication between transparent replicators 60 and 70 should be consistent without imposing excessive delays on the overall system.

Having described a preferred embodiment of the invention, it will now become apparent to those skilled in the art that other embodiments incorporating its concepts may be provided. It is felt therefore, that this invention should not be limited to the disclosed invention, but should be limited only by the spirit and scope of the appended claims.

What is claimed is:

1. A client-server network comprising:

a plurality of client computer systems, each of the client computer systems having a network interface;

a plurality of server computer systems, each of the server computer systems having a network interface; and a replicator system connecting the plurality of client computer systems to the plurality of server computer systems, the replicator system transparently processing a plurality of requests from the client systems to a plurality of services resident in the server systems.

2. The client-server network according to claim 1 wherein the replicator system comprises:

means for receiving a connection request and a plurality of subsequent packets of data associated with the connection request from a first client computer system to a first server computer system;

means for processing the connection request according to a plurality of policy parameters;

means for storing the connection request;

means for forwarding the connection request to one of the plurality of server computer systems;

means for receiving a reply from the one of the plurality of server computer systems in response to the connection request;

means for processing the reply;

means for storing the reply; and means for forwarding the reply to the first client computer system.

3. The client-server network according to claim 2 wherein the means for processing the connection request and the subsequent data packets comprises;

means for checking a first destination address of the connection request;

means for relating the first destination address to a second destination address according to a set of policy parameters;

means for storing the first destination address and the second destination address in a table in the replicator system;

means for detecting when the connection is aborted or closed.

4. The client-server network according to claim 3 wherein the set of policy parameters are selected form one of the following:

a performance variable of the first server computer system and a performance variable of the second sever computer system;

a plurality of parameters representing past operations, such plurality including round robin scheduling and affinity scheduling;

a failover parameter, the failover parameter indicating a system status of the first server computer system and the second server computer system; and a load balance system parameter.

5. The client-server network according to claim 1 wherein the replicator system comprises:

a first replicator system;

a second replicator system;

a connection between the first replicator system and the second replicator system, the connection used to coordinate processing in the first replicator system with processing in the second replicator system.

6. An arrangement for interfacing a plurality of client systems and a plurality of server systems in a computer network comprising:

a first network interface to receive a connection request from a first client system, the connection request containing an origination address indicating the first client system and a destination address indicating a first server system;

a memory to process the connection request and a plurality of subsequent data packets associated with the connection request and relate the destination address to one of the plurality of server system according to a set of policy parameters;

a storage subsystem to store the connection request and the relationship;

a second network interface to send the connection request to the one of the plurality of server systems;

a third network interface to receive an acknowledgment packet from the one of the plurality of server systems to the first client system;

the memory processing the acknowledgment packet according to the relationship; and a fourth network interface to send the acknowledgment to the first client system.

7. The arrangement according to claim 6 wherein the first network interface and the fourth network interface are a single network interface.

8. The arrangement according to claim 6 wherein the second network interface and the third network interface are a single network interface.

9. The arrangement according to claim 6 wherein the first network interface, the second network interface, the third network interface, and the fourth network interface is a single network interface.

10. The arrangement according to claim 6 wherein the set of policy parameters is selected from one of the following:

a performance variable of the first server system and a performance variable of a second server system;

a failover parameter, the failover parameter indicating a system status of the first server system and the second server system; and a load balance system parameter.

11. The arrangement according to claim 6 wherein the computer network uses the TCP/IP protocol.

12. The arrangement according to claim 6 wherein the computer network uses the UDP/IP protocol.

13. The arrangement according to claim 6 wherein the memory is non-volatile random access memory (NVRAM).

14. A method of improving performance and availability in network having a plurality of clients and a plurality of servers comprising the steps of:

provided a connection request from a first client to a first server;

intercepting the connection request;

processing the connection request according to a set of policy parameters to produce a relationship of addresses;

storing the relationship of addresses;

forwarding the connection request to one of the plurality of servers according to the relationship of addresses;

receiving an acknowledgment packet from the one of the plurality of servers;

processing the acknowledgment packet according to the stored relationship of addresses;

forwarding the acknowledgment packet to the first client according to the relationship of addresses; and Intercepting a plurality of subsequent data packets associated with the connection request;

repeating the steps of processing, forwarding, receiving, processing, and forwarding for the plurality of subsequent data packets.

15. The method of improving performance and availability in a network according to claim 14 where the set of policy parameters is selected from one of the following:

a performance variable of a first server and a performance variable of a second server;

a failover parameter, the failover parameter indicating a system status of the first server and the second server;

a plurality of parameters representing past operations, such plurality including round robin scheduling and affinity scheduling; and a load balance system parameter.

* * * * *